(12) United States Patent
Kawakami et al.

(10) Patent No.: US 12,170,542 B2
(45) Date of Patent: Dec. 17, 2024

(54) OPTICAL TRANSMITTER

(71) Applicant: NIPPON TELEGRAPH AND TELEPHONE CORPORATION, Tokyo (JP)

(72) Inventors: Hiroto Kawakami, Musashino (JP); Hiroshi Yamazaki, Musashino (JP); Yutaka Miyamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 72 days.

(21) Appl. No.: 18/012,032

(22) PCT Filed: Jul. 8, 2020

(86) PCT No.: PCT/JP2020/026651
§ 371 (c)(1),
(2) Date: Dec. 21, 2022

(87) PCT Pub. No.: WO2022/009324
PCT Pub. Date: Jan. 13, 2022

(65) Prior Publication Data
US 2023/0261755 A1   Aug. 17, 2023

(51) Int. Cl.
*H04B 10/54* (2013.01)
*H04B 10/50* (2013.01)

(52) U.S. Cl.
CPC ......... *H04B 10/541* (2013.01); *H04B 10/501* (2013.01)

(58) Field of Classification Search
None
See application file for complete search history.

(56) References Cited

U.S. PATENT DOCUMENTS

2011/0229150 A1* 9/2011 Nishihara .......... H04B 10/5162
                                                        398/195
2022/0043320 A1    2/2022 Kawakami et al.

FOREIGN PATENT DOCUMENTS

JP      2011-197436 A     10/2011
WO  WO-2020/044669 A1     3/2020

OTHER PUBLICATIONS

Sakamoto et al., "Phase-Conjugated Twin Signals Generation with Oppositely-Biased Paired IQ Modulators", 2014, 2014 IEEE Photonics Conference, Oct. 12, 2014 IEEE, pp. 300-301 (Year: 2014).*

(Continued)

*Primary Examiner* — David W Lambert

(57) ABSTRACT

An optical transmitter includes an I-component optical modulation unit, a Q-component optical modulation unit, and a 2×2 optical coupler. The I-component optical modulation unit generates modulated light based on an I-component data signal. The Q-component optical modulation unit generates modulated light based on a Q-component data signal. The 2×2 optical coupler receives the modulated light generated by the I-component optical modulation unit from a first input port, receives the modulated light generated by the Q-component optical modulation unit from a second input port, generates two optical QAM signals having a phase conjugate relationship from the modulated light which has been input from the first input port and the modulated light which has been input from the second input port, outputs one of said two optical QAM signals from a first output port, and outputs the other one of said two optical QAM signals from a second output port.

3 Claims, 6 Drawing Sheets

(56) References Cited

OTHER PUBLICATIONS

X. Liu et al., "Phase-conjugated twin waves for communication beyond the Kerr nonlinearity limit", Nature Photonics, vol. 7, p. 560-568, (2013).

T. Sakamoto et al., "Oppositely-Biased Dual-polarization IQ Modulators for Nonlinearity-Tolerant Polarization-Multiplexed Phase-Conjugated Twin-Signals Generation", ECOC 2015, ID:0792, (2015).

Takahide Sakamoto et al., "Phase-Conjugated Twin Signals Generation with Oppositely-Biased Paired IQ Modulators", 2014 IEEE Photonics Conference, 2014.

Henrik Eliasson et al., "Mitigation of nonlinearities using conjugate data repetition", Optics Express, 2015, vol. 23, issue3, pp. 2392-2402.

* cited by examiner

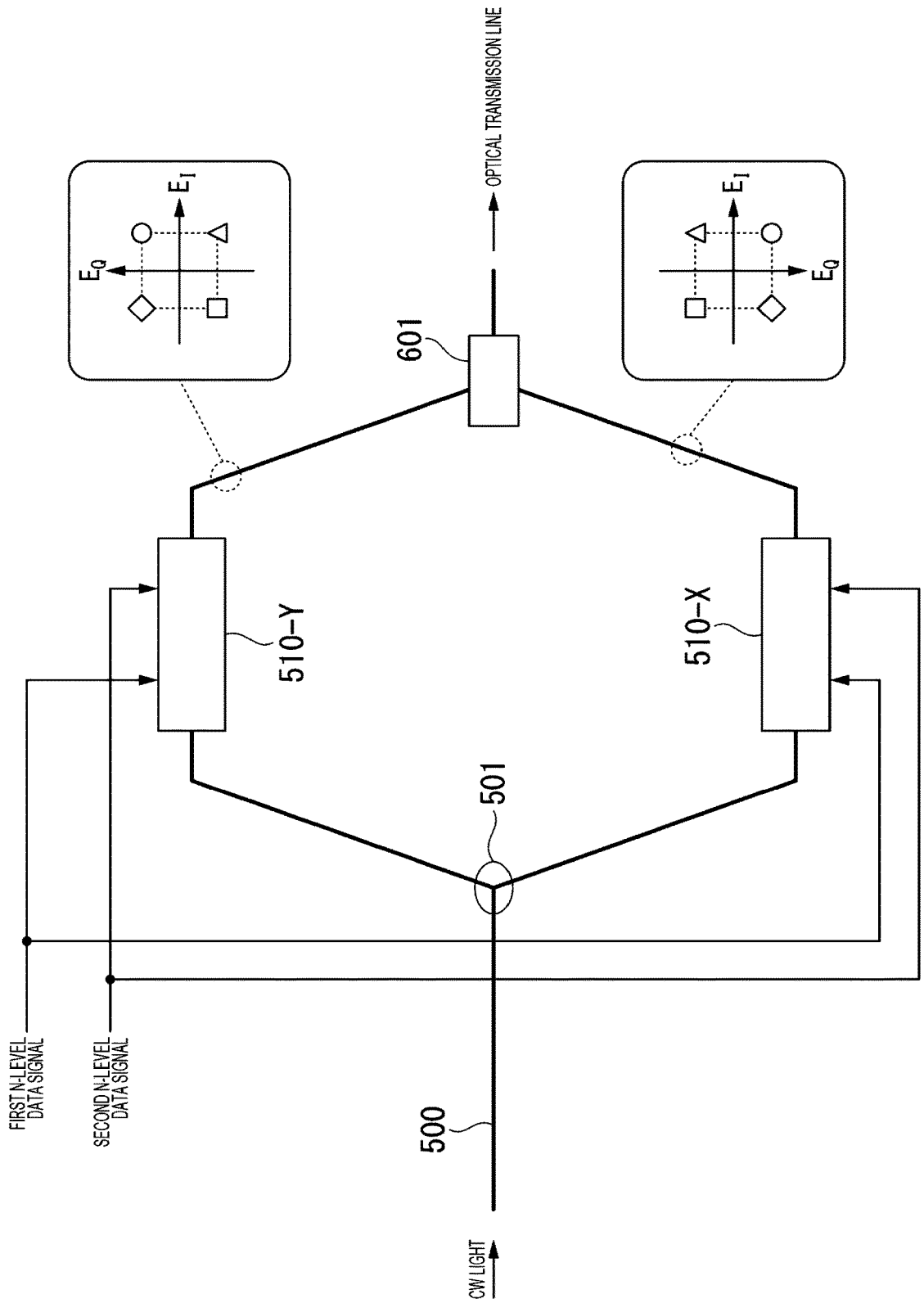

OPTICAL TRANSMITTER

CROSS-REFERENCE TO RELATED APPLICATIONS

This application is a 371 U.S. National Phase of International Application No. PCT/JP2020/026651, filed on Jul. 8, 2020. The entire disclosure of the above application is incorporated herein by reference.

TECHNICAL FIELD

The present invention relates to an optical transmitter.

BACKGROUND ART

As a transmission format used in an optical transmission system, a quadrature amplitude modulation (QAM) signal that allows transmission of a large-capacity optical signal at a low baud rate is known. The QAM signal includes not only information on a light intensity but also information on a light phase. For this reason, a variation of the optical phase due to a nonlinear optical effect in an optical transmission line becomes a big problem.

As means for solving the problem, an optical transmission system using phase-conjugated twin waves (PCTW) has been proposed. The optical transmission system outputs two optical QAM signals in a phase-conjugated relationship with each other from a transmitter. By simultaneously transmitting PCTW to the optical transmission line and comparing the PCTW on a receiving side, it is possible to cancel a nonlinear optical effect in the optical transmission line (refer to, for example, Non Patent Literatures 1 and 2).

FIG. 1 schematically illustrates transmission and demodulation of PCTW in a conventional configuration. In the following description, although an optical quadrature phase shift keying (QPSK) signal that is a four-value optical QAM signal will be described as an example, the same applies to other multi-level QAM signals.

In this specification, optical electric fields of in-phase and quadrature in the QAM signal are denoted by $E_I$ and $E_Q$. As illustrated on a left portion of FIG. 1, the optical QPSK signal includes four symbols. When these symbols are represented on a constellation, each symbol is placed at a vertex of a square. $E_I$ and $E_Q$ need to be orthogonal, and can be +90 degrees or −90 degrees. Whichever is selected, a signal quality is the same. On the other hand, a positional relationship between the symbols is not the same. This difference is indicated by four symbols of a circle, a triangle, a square, and a rhombus on a left portion of FIG. 1. These two optical QAM signals are in a phase-conjugated relationship with each other.

These two optical QAM signals are polarization-multiplexed by a polarization multiplexing unit 601, and thus PCTW are generated. A multiplexed X-polarization signal and a multiplexed Y-polarization signal are respectively denoted by $E_{x0}$ and $E_{y0}$. $E_{y0}$ is a phase conjugate of $E_{x0}$. This is represented as $E_{y0}=(E_{x0})^*$. $E_{x0}$ and $E_{y0}$ are transmitted to an optical transmission line 602 having a length L. These optical signals after being transmitted through the optical transmission line 602 are denoted by $E_{xL}$ and $E_{yL}$. In a case where the non-linear effect in the optical transmission line 602 cannot be ignored, a non-linear change occurs in optical electric fields of $E_{xL}$, and $E_{yL}$, and as a result, the signal quality is deteriorated.

On the other hand, in a case where digital coherent demodulation is performed in a receiver 603 and a phase conjugate of $E_{yL}$ is taken and then summed with $E_{xL}$, the change derived from the nonlinear optical effect is canceled. Thus, the signal quality can be improved.

FIG. 6 is a diagram illustrating a conventional configuration of a transmitter for PCTW generation. The continuous wave (CW) light which is input from an input port 500 is branched into two light beams by an optical branching unit 501. One light beam of the branched two light beams is incident on a first IQ modulator 510-X, and the other light beam of the branched two light beams is incident on a second IQ modulator 510-Y. As illustrated in FIG. 6, the first IQ modulator 510-X and the second IQ modulator 510-Y are driven by signals obtained by respectively branching a first n-level data signal and a second n-level data signal into two. In a case where the optical QAM signal having $n^2$-level is generated, each data signal has an n level.

The first IQ modulator 510-X and the second IQ modulator 510-Y need to generate optical QAM signals that are phase-conjugated with each other. This can be realized by appropriately setting optical phase adjustment in each IQ modulator (refer to, for example, Non Patent Literature 2). Alternatively, the same effect can be obtained by inverting only the second n-level data signal applied to the second IQ modulator 510-Y. The output of the first IQ modulator 510-X and the output of the second IQ modulator 510-Y are polarization-multiplexed by the polarization multiplexing unit 601, and the polarization-multiplexed light is transmitted to the optical transmission line.

CITATION LIST

Non Patent Literature

Non Patent Literature 1: X. Liu et al., "Phase-conjugated twin waves for communication beyond the Kerr nonlinearity limit," Nature Photonics, vol. 7, p. 560-568, (2013).

Non Patent Literature 2: T. Sakamoto et al., "Oppositely-Biased Dual-polarization IQ Modulators for Nonlinearity-Tolerant Polarization-Multiplexed Phase-Conjugated Twin-Signals Generation," ECOC 2015, ID:0792, (2015).

SUMMARY OF INVENTION

Technical Problem

According to the configuration for PCTW generation illustrated in FIG. 6, it is necessary to prepare two IQ modulators although only a signal corresponding to one optical QAM signal is generated as information. Further, although not illustrated in FIG. 6, it is necessary to prepare two sets of drive amplifiers for driving each IQ modulator. As a result, there is a problem that it is difficult to reduce a size of a device and reduce power consumption.

In view of the above circumstances, an object of the present invention is to provide an optical transmitter that generates PCTW while reducing components and power consumption.

Solution to Problem

According to an aspect of the present invention, there is provided an optical transmitter including: an I-component optical modulation unit (hereinafter also referred to as "I-component optical modulator") that generates modulated light based on an I-component data signal; a Q-component optical modulation unit (hereinafter also referred to as "Q-component optical modulator") that generates modulated light based on a Q-component data signal; and a 2×2 optical coupler that receives the modulated light generated by the I-component optical modulation unit from a first input port, receives the modulated light generated by the Q-component optical modulation unit from a second input port, generates two optical QAM signals having a phase conjugate relationship from the modulated light which has been input from the first input port and the modulated light which has been input from the second input port, outputs one of said two optical QAM signals from a first output port, and outputs the other one of said two optical QAM signals from a second output port.

Advantageous Effects of Invention

According to the present invention, it is possible to provide an optical transmitter that generates PCTW while reducing components and power consumption.

BRIEF DESCRIPTION OF DRAWINGS

FIG. 6 is a configuration diagram illustrating a configuration of a conventional transmitter for PCTW generation.

DESCRIPTION OF EMBODIMENTS

Hereinafter, an embodiment of the present invention will be described with reference to the drawings. The present embodiment relates to an optical transmitter having a function of simultaneously outputting an optical QAM signal and its phase-conjugated light and launching them to an optical transmission line.

First Embodiment

A transmitter for PCTW generation according to a first embodiment of the present invention has a configuration including a combination of a plurality of Mach-Zehnder interferometers (MZI) similarly to a normal IQ optical modulator. The transmitter for PCTW generation according to the present embodiment generates an optical $n^2$-QAM signal by modulating input CW light supplied from the outside on the basis of two n-level data signals, similarly to a conventional IQ optical modulator in terms of function.

On the other hand, the transmitter for PCTW generation according to the present embodiment is different from the conventional IQ modulator in light combining processing at a final stage. That is, the transmitter for PCTW generation according to the present embodiment is different from the conventional IQ optical modulator in that two optical $n^2$-QAM signals that are phase conjugated of each other are generated using a passive optical circuit and these two optical $n^2$-QAM signals are multiplexed.

Figure 1:
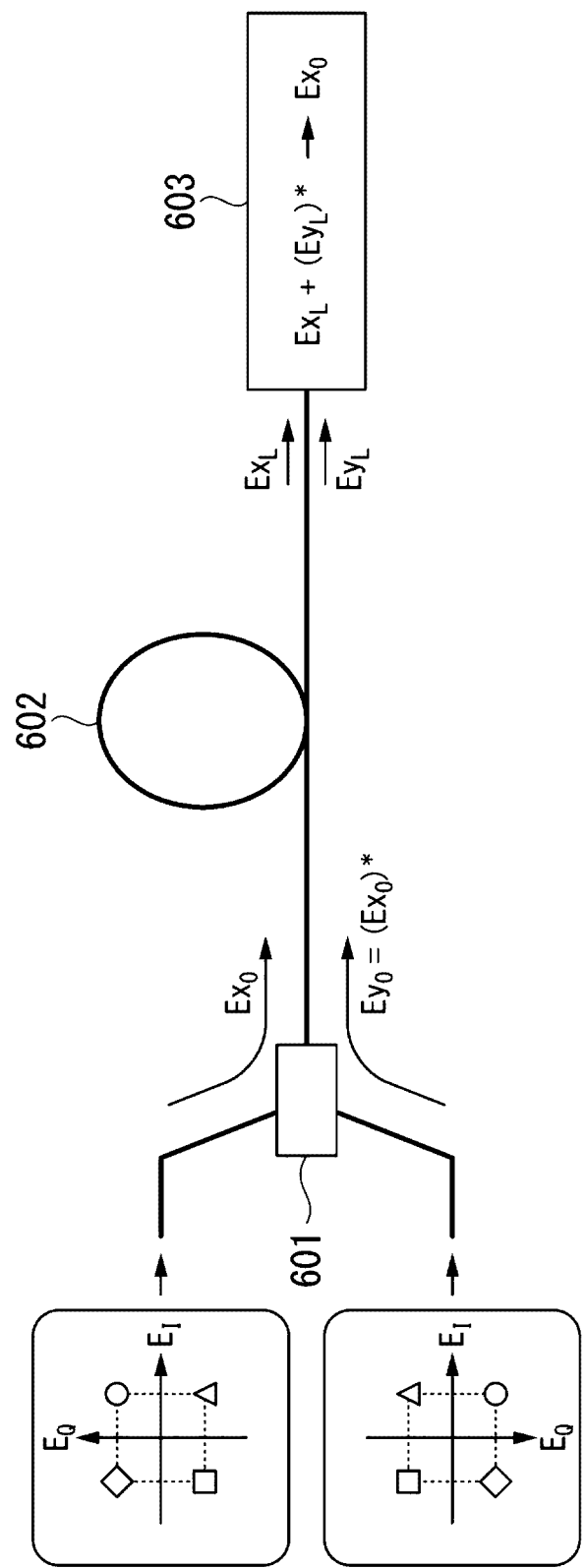
FIG. 1 is a conceptual diagram illustrating an optical transmission system using PCTW.
Figure 2:
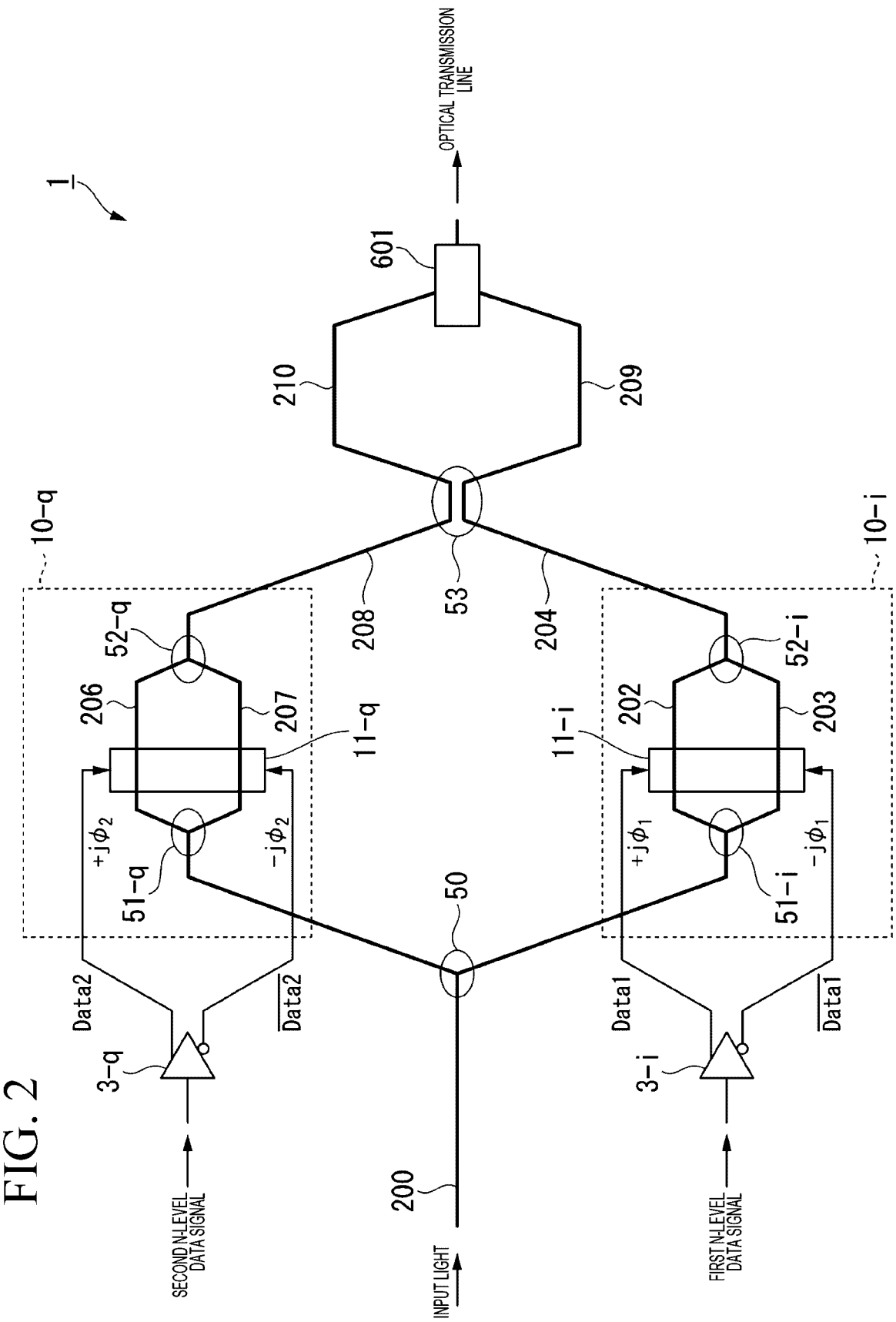
FIG. 2 is a configuration diagram of an optical transmitter according to a first embodiment.

FIG. 2 is a configuration diagram of an optical transmitter 1 according to the first embodiment. The optical transmitter 1 is a transmitter for PCTW generation, and is an example of a phase-conjugated optical translational transmitter. In FIG. 2, the same components as those illustrated in FIG. 1 and FIG. 6 referred to above are denoted by the same reference numerals.

The optical transmitter 1 includes an optical division unit 50, an I-component optical modulation unit 10-$i$, a Q-component optical modulation unit 10-$q$, a 2×2 optical coupler 53, and a polarization multiplexing unit (hereinafter also referred to as "polarization multiplexer") 601. The input light is input to an input optical waveguide 200. It is assumed that, in the present embodiment, all optical waveguides are polarization-maintaining waveguides unless otherwise specified. The optical division unit 50 divides the input light transmitted through the input optical waveguide 200 into two light beams. The optical division unit 50 outputs one of the two divided input light beams to the I-component optical modulation unit 10-$i$, and outputs the other of the two divided input light beams to the Q-component optical modulation unit 10-$q$.

The I-component optical modulation unit 10-$i$ includes an I-component optical division unit 51-$i$, an I-component optical coupling unit 52-$i$, an I-component RF signal application unit 11-$i$, and two arms. The two arms are, that is, an optical waveguide 202 and an optical waveguide 203. The I-component optical division unit 51-$i$ receives one of the two light beams divided by the optical division unit 50, and further divides the input light beam into two light beams. The I-component optical division unit 51-$i$ outputs one of the two divided light beams to the optical waveguide 202, and outputs the other of the two divided light beams to the optical waveguide 203. The component optical coupling unit 52-$i$ combines the light beam output from the optical waveguide 202 and the light beam output from the optical waveguide 203. The I-component optical modulation unit 10-$i$ outputs a light beam obtained by combining of the I-component optical coupling unit 52-$i$.

The Q-component optical modulation unit 10-$q$ includes a Q-component optical division unit 51-$q$, a Q-component optical coupling unit 52-$q$, a Q-component RF signal application unit 11-$q$, and two arms. The two arms are, that is, an optical waveguide 206 and an optical waveguide 207. The Q-component optical division unit 51-$q$ receives one of the two light beams divided by the optical division unit 50, and further divides the input light beam into two light beams. The Q-component optical division unit 51-$q$ outputs one of the two divided light beams to the optical waveguide 206, and outputs the other of the two divided light beams to the optical waveguide 207. The Q-component optical coupling unit 52-$q$ combines the light beam output from the optical waveguide 206 and the light beam output from the optical waveguide 207. The Q-component optical modulation unit 10-$q$ outputs a light beam obtained by combining of the Q-component optical coupling unit 52-$q$.

The I-component optical modulation unit 10-$i$ is connected to an I-component drive amplifier 3-$i$ via an I-component RF signal application unit 11-$i$, and the Q-component optical modulation unit 10-$q$ is connected to a Q-component drive amplifier 3-$q$ via a Q-component RF signal application unit 11-$q$. The I-component drive amplifier 3-$i$ generates an electric drive signal Data1 and an electric drive signal ⁻Data1 by differentially amplifying a first n-level data signal, and drives the I-component optical modulation unit 10-$i$ by using the generated drive signal Data1 and the generated drive signal ⁻Data1. Further, the Q-component drive amplifier 3-$q$ generates an electric drive signal Data2 and an electric drive signal ⁻Data2 by differentially amplifying a second n-level data signal, and drives the Q-component optical modulation unit 10-q by using the generated drive signal Data2 and the generated drive signal ⁻Data2.

Here, the n-level data signal is, for example, an n-level non return-to-zero (NRZ) signal, and "⁻" means inversion of logic.

The I-component RF signal application unit 11-i applies an electric field according to the drive signal Data1 to the optical waveguide 202, and applies an electric field according to the drive signal ⁻Data1 to the optical waveguide 203. Thereby, a phase change of +jφ₁ occurs with respect to the input light beam propagating through the optical waveguide 202, and a phase change of -jφ₁ occurs with respect to the input light beam propagating through the optical waveguide 203. Thus, modulated light is generated. Here, φ₁ has positive and negative values according to a value of the drive signal Data1.

The Q-component RF signal application unit 11-q applies an electric field according to the drive signal Data2 to the optical waveguide 206, and applies an electric field according to the drive signal ⁻Data2 to the optical waveguide 207. Thereby, a phase change of +jφ₂ according to the applied electric field occurs with respect to the input light beam propagating through the optical waveguide 206, and a phase change of -jφ₂ according to the applied electric field occurs with respect to the input light beam propagating through the optical waveguide 207. Thus, modulated light is generated. Here, φ₂ has positive and negative values according to a value of the drive signal Data2.

In a case where a propagation delay of each of the optical waveguides 202, 203, 206, and 207 is appropriately set, each of an optical output of the I-component optical modulation unit 10-i and an optical output of the Q-component optical modulation unit 10-q is n-level modulated light. Its amplitude of the optical electric field has n kinds of values at random according to a value of the drive signal Data1 and a value of the drive signal Data2. On the other hand, the optical phase is limited to two kinds of in-phase or opposite-phase.

When this n-level modulated light is represented on a constellation, n symbols are arranged on axes passing through the origin. These axes correspond to the above-described $E_I$ and $E_Q$ in the optical QAM signal. That is, $E_I$ and $E_Q$ are respectively optical electric fields of in-phase and quadrature in the QAM signal.

Figure 3:
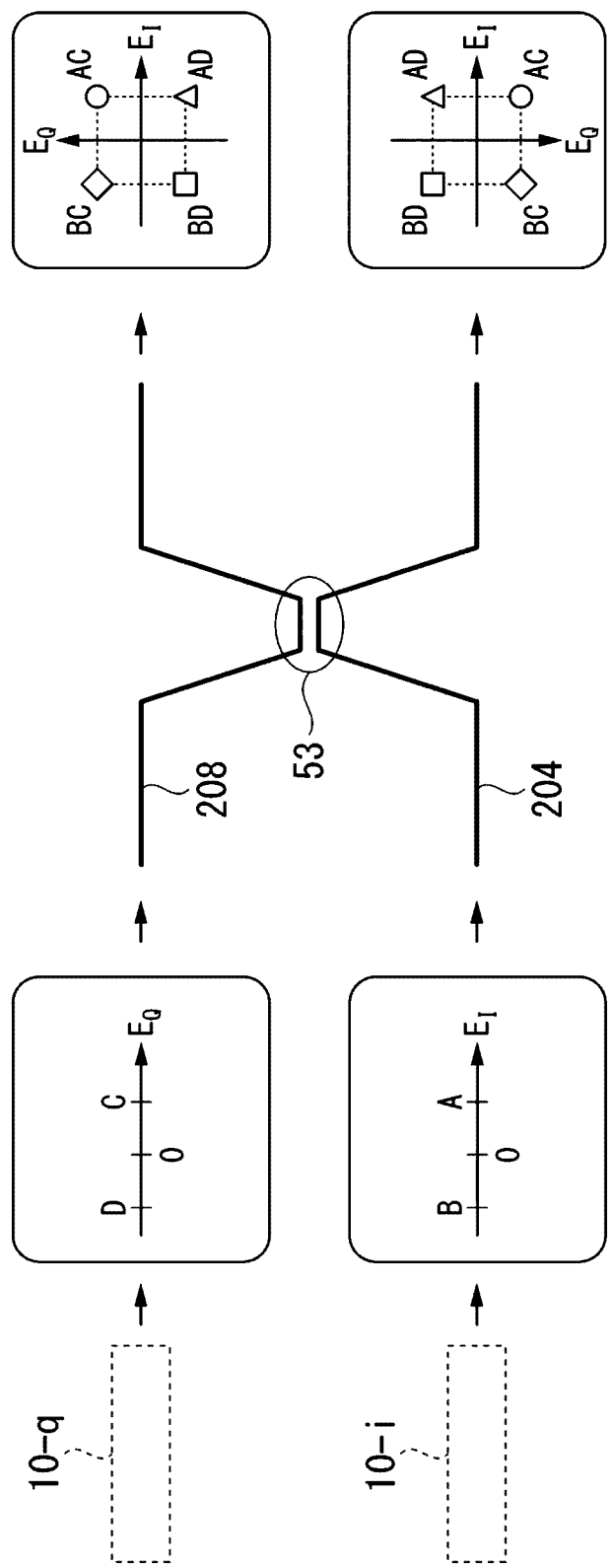
FIG. 3 is a conceptual diagram illustrating an operation of the optical transmitter according to the embodiment.

FIG. 3 is a conceptual diagram illustrating an operation of the optical transmitter 1. The constellations of the modulated light output from the I-component optical modulation unit 10-i and the modulated light output from the Q-component optical modulation unit 10-q are illustrated on a left portion of FIG. 3. Here, when assuming n=2, each constellation includes two symbols. In FIG. 3, these four symbols are indicated by A, B, C, and D. 0 indicates the origin of a complex plane. In a case where a configuration of the MZI is ideal, the symbol A and the symbol B are arranged symmetrically with respect to the origin on the $E_I$, and the symbol C and the symbol D are arranged symmetrically with respect to the origin on the $E_Q$.

The modulated light output from the I-component optical modulation unit 10-i propagates through the optical waveguide 204, and the modulated light output from the Q-component optical modulation unit 10-q propagates through the optical waveguide 208. The modulated light output from the I-component optical modulation unit 10-i is input to one input port of two input ports of the 2×2 optical coupler 53, and the modulated light output from the Q-component optical modulation unit 10-q is input to the other input port of two input ports of the 2×2 optical coupler 53. In a case where propagation delays of the optical waveguide 204 and the optical waveguide 208 are appropriately set, at two output ports of the 2×2 optical coupler 53, $E_I$ and $E_Q$ are coupled so as to be orthogonal to each other, and thus two QPSK signals are generated. A right portion of FIG. 3 illustrates constellations of these generated QPSK signals. Here, a symbol generated by coupling of the symbol A and the symbol C is indicated by AC. The same applies to AD, BD, and BC.

At each port, rotations of the optical phases generated by the 2×2 optical coupler 53 are different from each other. For this reason, in one of these two constellations, $E_I$ and $E_Q$ are orthogonal to each other at +90 degrees, and in the other of these two constellations, $E_I$ and $E_Q$ are orthogonal to each other at -90 degrees. Therefore, these QPSK signals are phase-conjugated with each other.

Here, returning to FIG. 2 again, the configuration according to the first embodiment will be described. One light beam of the light beams output from the two output ports of the 2×2 optical coupler 53 propagates through an optical waveguide 209, and the other light beam of the light beams propagates through an optical waveguide 210. The polarization multiplexing unit 601 polarization-multiplexes the light beam propagated through the optical waveguide 209 and the light beam propagated through the optical waveguide 210, and launches this polarization-multiplexed light beams to the optical transmission line as PCTW.

According to the present embodiment, the optical transmitter includes the I-component optical modulation unit, the Q-component optical modulation unit, and the 2×2 coupler. The I-component optical modulation unit generates modulated light based on the I-component data signal, and the Q-component optical modulation unit generates modulated light based on the Q-component data signal. The 2×2 optical coupler includes a first input port, a second input port, a first output port, and a second output port. The 2×2 optical coupler receives the modulated light generated by the I-component optical modulation unit from the first input port, receives the modulated light generated by the Q-component optical modulation unit from the second input port, and generates two optical QAM signals in a phase-conjugated relationship with each other by mixing the modulated light which is received from the first input port and the modulated light which is received from the second input port. The 2×2 optical coupler outputs the generated one optical QAM signal from the first output port, and outputs the other optical QAM signal from the second output port. Further, the transmitter polarization-multiplexes the two optical QAM signals that are output from the 2×2 optical coupler and are in a phase-conjugated relationship with each other.

According to the present embodiment, it is possible to realize an optical transmitter that generates PCTW while reducing components and power consumption.

Second Embodiment

In the first embodiment, the optical transmitter generates PCTW by polarization-multiplexing two optical QAM signals that are phase-conjugated with each other. In a second embodiment according to the present invention, the optical transmitter generates PCTW by time division multiplexing instead of polarization multiplexing. In the second embodiment, the optical QAM signals are RZ-QAM signals, and it is necessary to extinguish the optical electric field to zero level every symbol period.

Figure 4:
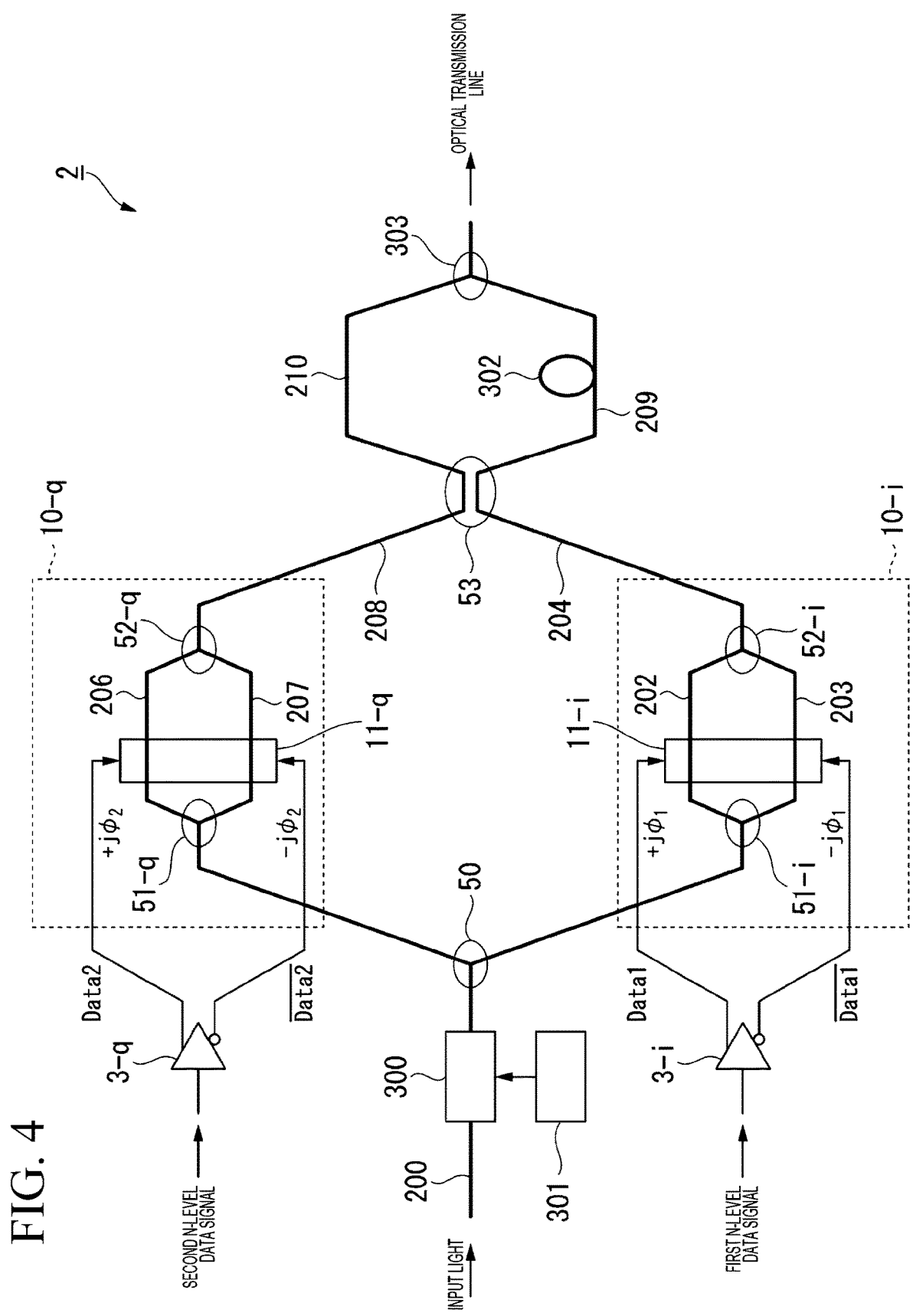
FIG. 4 is a configuration diagram of an optical transmitter according to a second embodiment.

FIG. 4 is a configuration diagram of an optical transmitter 2 according to the second embodiment. The optical transmitter 2 is a transmitter for PCTW generation, and is an example of a phase-conjugated optical translational transmitter. In FIG. 4, the same components as those illustrated in FIG. 1 and FIG. 2 referred to above are denoted by the same reference numerals. Further, a description of components having the same functions as the components illustrated in FIG. 1 and FIG. 2 will be omitted.

The optical transmitter 2 illustrated in FIG. 4 is different from the optical transmitter 1 illustrated in FIG. 2 in that a pulse carver 300 and a clock 301 are further included, in that a delay optical waveguide 302 is included in the optical waveguide 209, and in that a combining unit (hereinafter also referred to as "combiner") 303 is included instead of the polarization multiplexing unit 601. The pulse carver 300 is provided on the input optical waveguide 200.

In the present embodiment, the input light is input to the pulse carver 300 via the input optical waveguide 200. The pulse carver 300 generates an optical pulse train with a period T from the input light. A modulation period of the pulse carver 300 is controlled by the clock 301. The period is synchronized with a symbol period of the first n-level data signal and a symbol period of the second n-level data signal.

In the present embodiment, the modulated light propagating through the optical waveguide 209 and the modulated light propagating through the optical waveguide 210 are periodically extinguished by the pulse carver 300. Therefore, time division multiplexing can be performed by using the delay optical waveguide 302 with a delay of T/2. The output of the delay optical waveguide 302 and the output of the optical waveguide 210 are combined, time division multiplexed, and then launched to the optical transmission line by the combining unit 303.

Figure 5:
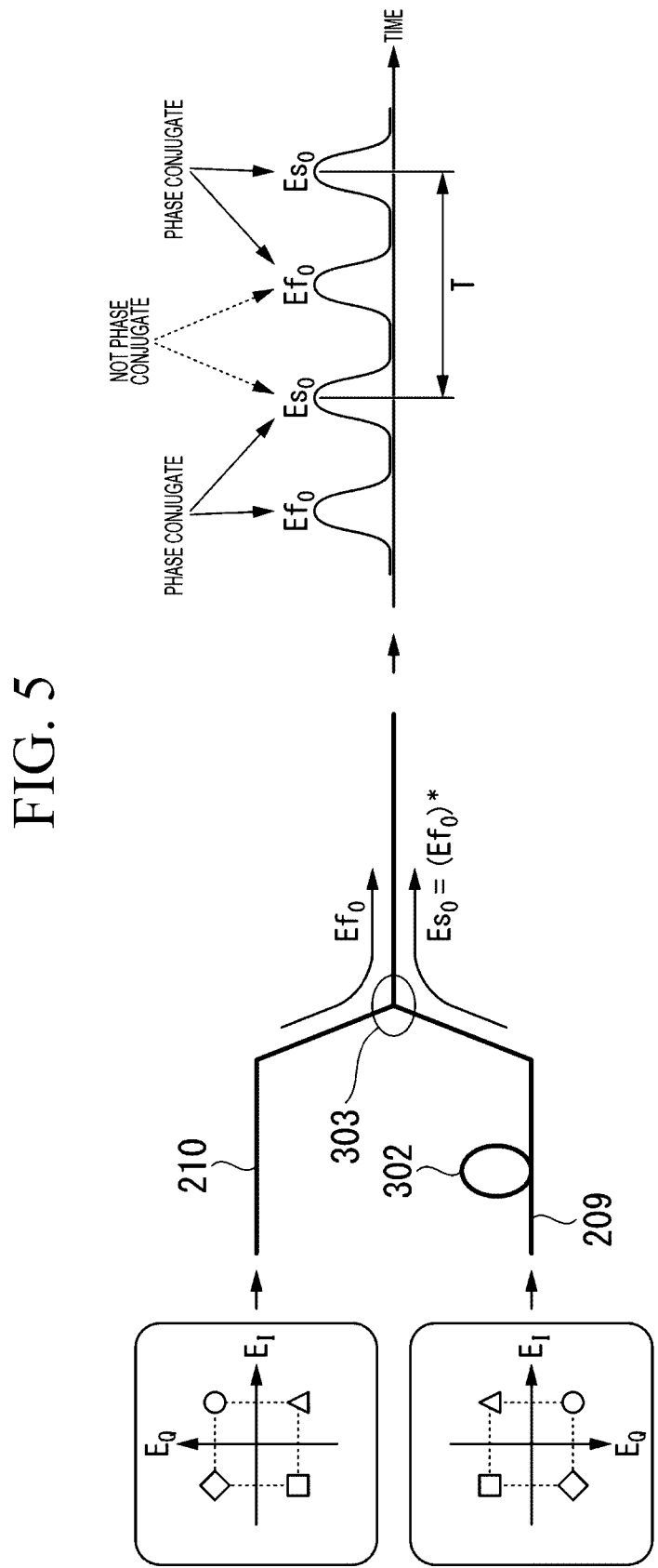
FIG. 5 is a conceptual diagram illustrating an optical pulse train in a case where the optical transmitter according to the embodiment is used.

FIG. 5 is a conceptual diagram illustrating an optical pulse train launched to an optical transmission line in a case where the optical transmitter 2 is used. The optical pulse train illustrated in FIG. 5 is a time division multiplexed optical RZ-QAM signal. Here, the light propagated through the optical waveguide 209 and the delay optical waveguide 302 is denoted by $E_{s0}$, and the light propagated through the optical waveguide 210 is denoted by $E_{f0}$. In a stage of output from the combining unit 303, $E_{s0}$ and $E_{f0}$ are alternately launched to the optical transmission line. Here, $E_{f0}$ and $E_{s0}$ transmitted immediately after said $E_{f0}$ are in a phase-conjugated relationship. However, $E_{s0}$ and $E_{f0}$ transmitted immediately after said $E_{s0}$ are not in a phase-conjugated relationship.

The combining unit 303 launches the optical RZ-QAM signal to the optical transmission line 602. A receiver 603 receives the optical RZ-QAM signal transmitted through the optical transmission line 602. In the embodiment, the receiver 603 sequentially demodulates and records pulse trains of continuously-received optical RZ-QAM signals, selects a set of signals determined to be in a phase-conjugated relationship, and performs a calculation of $E_{s0}+(E_{f0})^*$. Thereby, the receiver 603 corrects a nonlinear optical effect in the transmission line.

As compared with the first embodiment, the embodiment has difficulty in correctly selecting a set of optical pulses in a phase-conjugated relationship, in addition to a limitation on a signal format. However, in a case where a device having a large polarization dependent loss (PDL) is provided on the optical transmission line, an influence of PDL can be reduced. Further, in the embodiment, PCTW is on the same polarization, and thus it is also possible to polarization-multiplex other optical signals.

According to the present embodiment, the optical transmitter includes the I-component optical modulation unit, the Q-component optical modulation unit, the 2×2 coupler, a delay unit (hereinafter also referred to as "delayer"), and the combining unit. The 2×2 optical coupler receives, from the first input port, the modulated light generated based on the I-component data signal by the I-component optical modulation unit, and receives, from the second input port, the modulated light generated based on the Q-component data signal by the Q-component optical modulation unit. The 2×2 optical coupler outputs, from the first output port, one optical QAM signal of two optical QAM signals which are generated by mixing two pieces of the input modulated light and are in a phase-conjugated relationship, and outputs, from the second output port, the other optical QAM signal of the two optical QAM signals. The optical QAM signal is an RZ-QAM signal that is periodically extinguished by the pulse carver in the period T. The delay unit gives a delay of a time T/2 to one optical QAM signal of the two optical QAM signals which are output from the 2×2 optical coupler and are in a phase-conjugated relationship with each other. The combining unit combines the optical QAM signal which is delayed by the delay unit and the optical QAM signal which is not delayed, and outputs the combined signal.

Application of Embodiment

In the embodiments described above, it is assumed that the propagation delay of each optical waveguide is appropriately maintained. On the other hand, an optimum value of the propagation delay depends on a wavelength of the input light, and varies depending on a change in environmental temperature. In a conventional optical modulator, generated optical signals are tapped for monitoring, and appropriately adjusting propagation delays of these optical waveguides by using an automatic bias control device has been widely performed. In order to enable this control, a tap for signal quality monitoring may be provided in either or both of the optical waveguide 209 and the optical waveguide 210.

According to the embodiments described above, the phase-conjugated optical translational transmitter includes the I-component optical modulation unit that generates modulated light on the basis of the I-component data signal and the Q-component optical modulation unit that generates modulated light on the basis of the Q-component data signal. The phase-conjugated optical translational transmitter generates and outputs two optical QAM signals in a phase-conjugated relationship with each other by mixing the output light of the I-component optical modulation unit and the output light of the Q-component optical modulation unit. The two optical QAM signals in a phase-conjugated relationship with each other are generated by respectively inputting the output light of the I-component optical modulation unit and the output light of the Q-component optical modulation unit to the two input ports of the 2×2 optical coupler. The two optical QAM signals are polarization-multiplexed by the polarization multiplexing unit, the optical QAM signals being output from the two output ports of the 2×2 optical coupler and being in a phase-conjugated relationship with each other.

Further, the optical QAM signal may be an RZ-QAM signal that is periodically extinguished by the pulse carver in the period T. In this case, one optical QAM signal of the two optical QAM signals is delayed by a time T/2 by the delay unit and then time division multiplexed with the other optical QAM signal, the optical QAM signals being output from the two output ports of the 2×2 optical coupler and being in a phase-conjugated relationship with each other.

Thereby, the two optical QAM signals in a phase-conjugated relationship with each other are continuously output.

As above, the embodiments of the present invention have been described in detail with reference to the drawings. On the other hand, the specific configuration is not limited to the embodiments, and includes design and the like without departing from the spirit of the present invention.

INDUSTRIAL APPLICABILITY

The optical transmitter can be used by being incorporated into an optical transmission system.

REFERENCE SIGNS LIST

| | |
|---|---|
| 1 | optical transmitter |
| 2 | optical transmitter |
| 3-i | I-component drive amplifier |
| 3-q | Q-component drive amplifier |
| 10-i | I-component optical modulation unit |
| 10-q | Q-component optical modulation unit |
| 11-i | I-component RF signal application unit |
| 11-q | Q-component RF signal application unit |
| 50 | optical division unit |
| 51-i | I-component optical division unit |
| 51-q | Q-component optical division unit |
| 52-i | I-component optical coupling unit |
| 52-q | Q-component optical coupling unit |
| 53 | 2x2 optical coupler |
| 200 | input optical waveguide |
| 202 | optical waveguide |
| 203 | optical waveguide |
| 204 | optical waveguide |
| 206 | optical waveguide |
| 207 | optical waveguide |
| 208 | optical waveguide |
| 209 | optical waveguide |
| 210 | optical waveguide |
| 300 | pulse carver |
| 301 | clock |
| 302 | delay optical waveguide |
| 303 | combining unit |
| 500 | input port |
| 501 | optical branching unit |
| 510-X | first IQ modulator |
| 510-Y | second IQ modulator |
| 601 | polarization multiplexing unit |
| 602 | optical transmission line |
| 603 | receiver |

The invention claimed is:

1. An optical transmitter comprising:
an I-component optical modulator that generates modulated light based on an I-component data signal;
a Q-component optical modulator that generates modulated light based on a Q-component data signal;
a 2×2 optical coupler that receives the modulated light generated by the I-component optical modulator from a first input port, receives the modulated light generated by the Q-component optical modulator from a second input port, generates two optical QAM signals having a phase conjugate relationship from the modulated light which has been input from the first input port and the modulated light which has been input from the second input port, outputs one of said two optical QAM signals from a first output port, and outputs the other one of said two optical QAM signals from a second output port;
a delayer that gives a delay of a time T/2 to the optical QAM signal output from the first output port of the 2×2 optical coupler and are in a phase-conjugated relationship with each other; and
a combiner that combines the one optical QAM signal which has been delayed by the delayer and the other optical QAM signal output from the second output port of the 2×2 optical coupler and has not been delayed, wherein the said two optical QAM signals are RZ-QAM signals which are periodically extinguished with period T by a pulse carver.

2. An optical transmitter comprising:
an I-component optical modulator that generates modulated light based on an I-component data signal;
a Q-component optical modulator that generates modulated light based on a Q-component data signal;
a 2×2 optical coupler that receives the modulated light generated by the I-component optical modulator from a first input port, receives the modulated light generated by the Q-component optical modulator from a second input port, generates two optical QAM signals having a phase conjugate relationship from the modulated light which has been input from the first input port and the modulated light which has been input from the second input port, outputs one of said two optical QAM signals from a first output port, and outputs the other one of said two optical QAM signals from a second output port; and
a polarization multiplexer that polarization-multiplexes the two optical QAM signals which have been output from the 2×2 optical coupler and are in a phase-conjugated relationship with each other, wherein all of the first input port, the second input port, the first output port and the second output port include polarization-maintaining waveguides.

3. The optical transmitter according to claim 2, further comprising:
a delayer that gives a delay of a time T/2 to the one optical QAM signal output from the first output port of the the 2×2 optical coupler and are in a phase-conjugated relationship with each other;
and a combiner that combines the one optical QAM signal which has been delayed by the delayer and other optical QAM signal which has been output from the second output port of the 2×2 optical coupler and has not been delayed, wherein the said two optical QAM signals are RZ-QAM signals which are periodically extinguished with period T by a pulse carver.

* * * * *